United States Patent
Mestery et al.

(10) Patent No.: US 12,423,157 B2
(45) Date of Patent: *Sep. 23, 2025

(54) SYSTEMS AND METHODS PROVIDING SERVERLESS DNS INTEGRATION

(71) Applicant: Cisco Technology, Inc., San Jose, CA (US)

(72) Inventors: Kyle Andrew Donald Mestery, Woodbury, MN (US); Ian Wells, San Jose, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,276

(22) Filed: Feb. 6, 2024

(65) Prior Publication Data

US 2024/0176672 A1 May 30, 2024

Related U.S. Application Data (63) Continuation of application No. 16/518,242, filed on Jul. 22, 2019, now Pat. No. 11,928,514.

(51) Int. Cl.
| | |
|---|---|
| *H04L 67/53* | (2022.01) |
| *G06F 9/50* | (2006.01) |
| *H04L 43/16* | (2022.01) |
| *H04L 67/1004* | (2022.01) |
| *H04L 67/1008* | (2022.01) |
| *H04L 67/1031* | (2022.01) |

(52) U.S. Cl.
CPC .............. *G06F 9/505* (2013.01); *H04L 67/53* (2022.05); *H04L 43/16* (2013.01); *H04L 67/1004* (2013.01); *H04L 67/1008* (2013.01); *H04L 67/1031* (2013.01)

(58) Field of Classification Search
CPC ..... H04L 67/53; H04L 67/1031; H04L 43/16; H04L 67/1008; H04L 61/4511; H04L 47/125; G09F 9/45558; G06F 11/3433
See application file for complete search history.

(56) References Cited

U.S. PATENT DOCUMENTS

| | | | |
|---|---|---|---|
| 10,182,033 B1 * | 1/2019 | Farhangi | H04L 43/16 |
| 10,782,934 B1 * | 9/2020 | Chawda | G06F 8/30 |
| 11,159,366 B1 * | 10/2021 | Gawade | H04L 41/0895 |
| 2017/0141984 A1 | 5/2017 | Seo et al. | |
| 2018/0288091 A1 * | 10/2018 | Doron | H04L 63/1458 |
| 2018/0375712 A1 | 12/2018 | Krohling et al. | |
| 2019/0079804 A1 | 3/2019 | Thyagarajan | |
| 2019/0384655 A1 * | 12/2019 | Krishna Singuru | G06F 9/542 |
| 2020/0034127 A1 * | 1/2020 | Burrowes | G06F 11/3433 |

(Continued)

OTHER PUBLICATIONS

Hong S., et al., "Go Serverless: Securing Cloud Via Serverless Design Patterns," USENIX, May 2, 2018, pp. 1-8.

*Primary Examiner* — Tom Y Chang
(74) *Attorney, Agent, or Firm* — Polsinelli P.C.

(57) ABSTRACT

A method includes receiving a DNS request, notifying a serverless orchestrator system of data associated with the DNS request, provisioning a function on a serverless function node based on the DNS request, notifying a load balancer regarding the serverless function node, providing a response to the DNS request and routing an API request associated with the DNS request to the serverless function node.

20 Claims, 7 Drawing Sheets

(56) References Cited

U.S. PATENT DOCUMENTS

| | | | |
|---|---|---|---|
| 2020/0142711 A1* | 5/2020 | Varda | H04L 67/34 |
| 2020/0250323 A1* | 8/2020 | Remington | G06F 21/6281 |
| 2020/0356397 A1* | 11/2020 | Kumatagi | G06F 9/455 |
| 2020/0366733 A1* | 11/2020 | Parvataneni | H04L 41/342 |
| 2020/0396178 A1 | 12/2020 | Mestery et al. | |
| 2020/0401452 A1* | 12/2020 | Piercey | G06F 9/5016 |

* cited by examiner

SYSTEMS AND METHODS PROVIDING SERVERLESS DNS INTEGRATION

CROSS-REFERENCE TO RELATED APPLICATIONS

This application is a Continuation of U.S. patent application Ser. No. 16/518,242, filed Jul. 22, 2019, entitled, "SYSTEMS AND METHODS PROVIDING SERVERLESS DNS INTEGRATION", which is incorporated herein by reference in its entirety.

TECHNICAL FIELD

The subject matter of this disclosure relates in general to serverless functions and more specifically to approaches to improving the start-up, execution, and reaping of serverless functions which can lead to productivity gains, including systems designed to handle running serverless functions.

BACKGROUND

Serverless architecture (also known as serverless computing or function as a service, FaaS) is a software design pattern where applications are hosted by a third-party service, eliminating the need for server software and hardware management by the developer. Applications are broken up into individual functions that can be invoked and scaled individually.

Hosting a software application on the Internet usually involves managing some kind of server infrastructure. Typically this means a virtual or physical server that needs to be managed, as well as the operating system and other web server hosting processes required for an application to run. Using a virtual server from a cloud provider such as Amazon or Microsoft does mean the elimination of the physical hardware concerns, but still requires some level of management of the operating system and the web server software processes.

With a serverless architecture, users can focus purely on the individual functions in the application code. Services such as Twilio Functions, AWS Lambda and Microsoft Azure Functions take care of all the physical hardware, virtual machine operating system, and web server software management. In this case, a developer only needs to worry about their code. In this sense, serverless functions are even more ephemeral then traditional compute units. The execution time for such a function may be in the order of milliseconds which can include the scaffolding required to bring them up.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure provides improvements in the start-up, execution and utilization of serverless functions and introduces mechanisms to provide productivity gains. The disclosure also covers systems designed to handle running serverless functions. The disclosure provides mechanisms to understand when a serverless function will be executed and includes approaches to ensure the efficient running of that serverless function.

An example method includes receiving a DNS request, notifying a serverless orchestrator system of data associated with the DNS request, provisioning a function on a serverless function node based on the DNS request, notifying a load balancer regarding the serverless function node, providing a response to the DNS request and routing an API request associated with the DNS request to the serverless function node. In this manner, the function operating on the serverless function node an already be spun-up and running by the time the API request is received for use of the function.

In one aspect, the method can include, after the function on the serverless function node performs an operation based on the application programming interface request, removing the function from the serverless function node. Other alternate steps include providing the response to the domain name system request after the function is provisioned on the serverless function node. The data associated with the domain name system request can be used by an algorithm on a serverless orchestrator to spin up the function on the serverless function node. In another aspect, the data can include one or more parameters associated with characteristics of a workload to be performed by the function on the serverless function node.

In yet another aspect, the method can include one or more of the following: (1) the receiving of the domain name system request can be performed by a domain name server; (2) the notifying of the serverless orchestrator system can be performed by the domain name server; (3) the provisioning of the function on the serverless function node can be performed by the serverless orchestrator system; (4) the notifying of the load balancer regarding the serverless function node operating the function can be performed by the serverless orchestrator system; (5) the providing of the response to the domain name system request can be performed by the domain name server; and (6) the routing of the application programming interface request associated with the domain name system request to the serverless function node and be performed by a load balancer.

The data associated with the domain name system query can be used by an algorithm on a serverless orchestrator to spin up the function on the serverless function node. In one aspect, the data can include one or more parameters associated with characteristics of a workload to be performed by the function on the serverless function node.

In a system aspect, a system can include one or more processor and a computer readable medium, storing instructions which, when executed by the processor, cause the one or more processor to perform operations including one or more of: (1) receiving a domain name system request; (2) notifying a serverless orchestrator system of data associated with the domain name system request; (3) provisioning a function on a serverless function node based on the domain name system request; (4) notifying a load balancer regarding the serverless function node operating the function; (5) providing a response to the domain name system request; and (6) routing an application programming interface request associated with the domain name system request to the serverless function node.

One aspect of this disclosure is a computer-readable storage device that stores instructions which, when executed by one or more processors, cause is the one or more processors to perform operations including one or more of: (1) receiving a domain name system request; (2) notifying a serverless orchestrator system of data associated with the domain name system request; (3) provisioning a function on a serverless function node based on the domain name system request; (4) notifying a load balancer regarding the serverless function node operating the function; (5) providing a response to the domain name system request; and (6) routing an application programming interface request associated with the domain name system request to the serverless function node.

DESCRIPTION OF EXAMPLE EMBODIMENTS

Disclosed herein are systems, methods, and computer-readable media for innovations which focus on the ability to improve the start-up and execution of serverless functions. A serverless environment is typically composed of several serverless functions, each in support of a separate application programming interface (API). These are also typically orchestrated by an orchestration system. When a developer is building a serverless function in support of an API, it will usually end up being a service. These services are in fact usually reachable via a Domain Name System (DNS). Each service ends up with the unique DNS name. The mapping of services to DNS names is useful and is an important component of many serverless and even container orchestration systems.

Container orchestration relates to managing the lifecycles of containers, especially in large, dynamic environments. Containers are implemented in a kernel such as in the Linux kernel so that they share their resources with a host. A container can also be described as an isolated execution environment on a host and behaves much like a full featured Linux installation with its own users, file system, processes and network stack. Running an application inside of a container isolates it from the host and other containers meaning that even when the applications inside of them are running as root, they cannot access or modify the files processes users or other resources of the host or other containers. Software teams use container orchestration to control and automate many tasks, such as provisioning and deployment of containers, redundancy and availability of containers, scaling up or removing containers to spread application load evenly across host infrastructure, movement of containers from one host to another if there is a shortage of resources in a host, or if a host dies, allocation of resources between containers, external exposure of services running in a container with the outside world, load balancing of service discovery between containers, health monitoring of containers and hosts and configuration of an application in relation to the containers running it.

When a system uses a container orchestration tool, like Kubernetes or Docker Swarm (more on these shortly), the administrator typically describes the configuration of the application in a YAML (which stands for "YAML ain't markup language") or JSON (JavaScript Object Notation) file, depending on the orchestration tool. These configurations files (for example, docker-compose.yml) are used to instruct the orchestration tool where to gather container images (for example, from Docker Hub), how to establish networking between containers, how to mount storage volumes, and where to store logs for that container. Typically, teams will branch and version-control these configuration files so they can deploy the same applications across different development and testing environments before deploying them to production clusters.

Containers are deployed onto hosts, usually in replicated groups. When it is time to deploy a new container into a cluster, the container orchestration tool schedules the deployment and looks for the most appropriate host to place the container based on predefined constraints (for example, CPU or memory availability). An administrator can even place containers according to labels or metadata, or according to their proximity in relation to other hosts—all kinds of constraints can be used.

Once the container is running on the host, the orchestration tool manages its lifecycle according to the specifications you laid out in the container's definition file (for example, its Dockerfile). The value of container orchestration tools is that administrators can use them in any environment in which they can run containers. And containers are supported in just about any kind of environment, from traditional on-premise servers to public cloud instances running in Amazon Web Services (AWS), Google Cloud Platform (GCP), or Microsoft Azure. Additionally, most container orchestration tools are built with Docker containers in mind.

The proposal disclosed herein is to enhance the sequence ecosystem by integrating a load balanced DNS server with a container orchestration system. One of the challenges addressed by this disclosure is the ability to spin up a serverless function in response to an API call which requests the use of that function. The question is how to efficiently implement the serverless function in response to such an API call or in response to a DNS request prior to an API call. As noted above, serverless functions are ephemeral in that they only exist to service a particular API call and then they will disappear. In some cases, it takes longer to orchestrate and spin up the service function then to actually perform the work by the service function.

Figure 1:
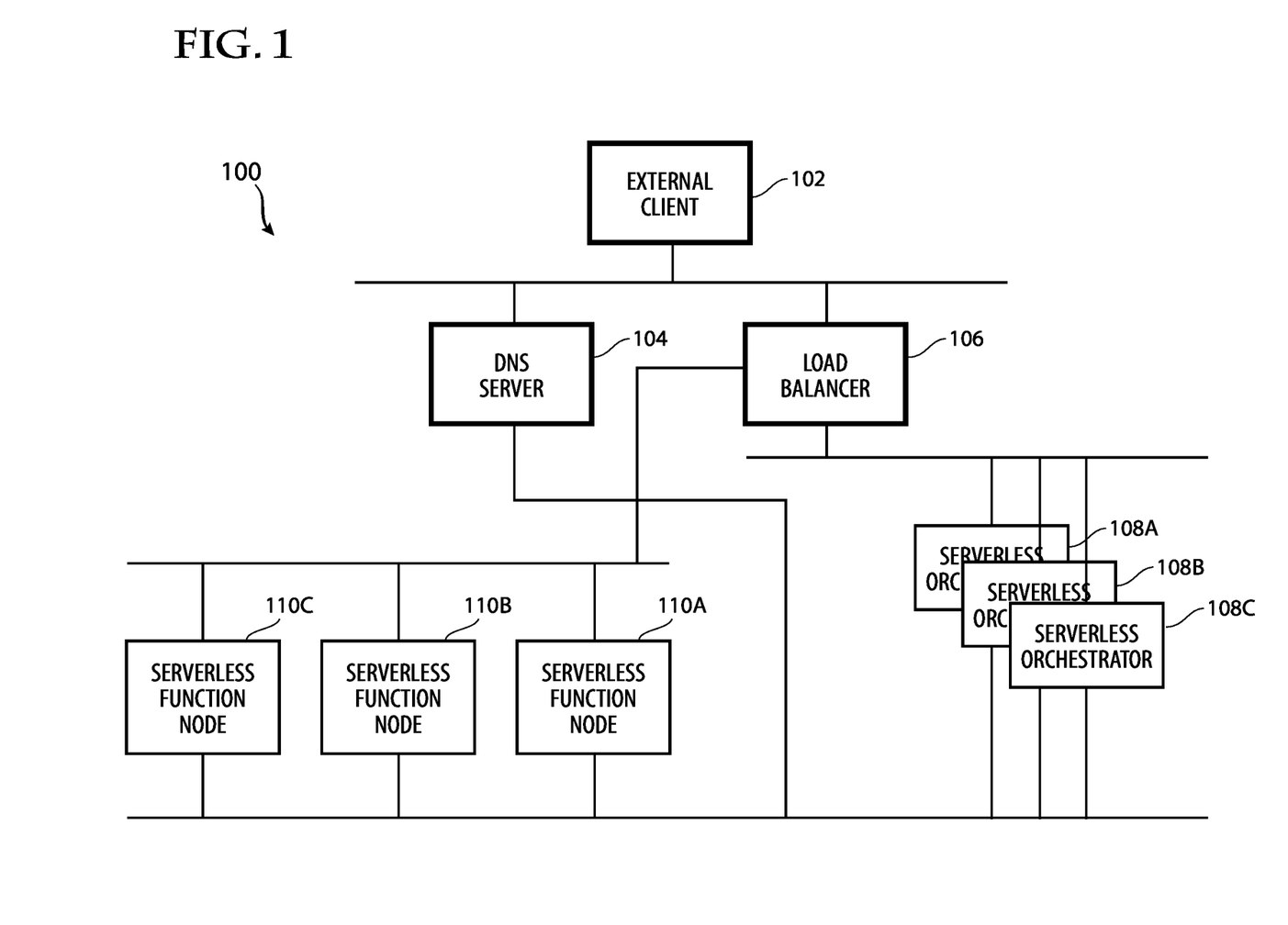
FIG. 1 illustrates a topology of an enterprise network in accordance with some examples.
Figure 2:
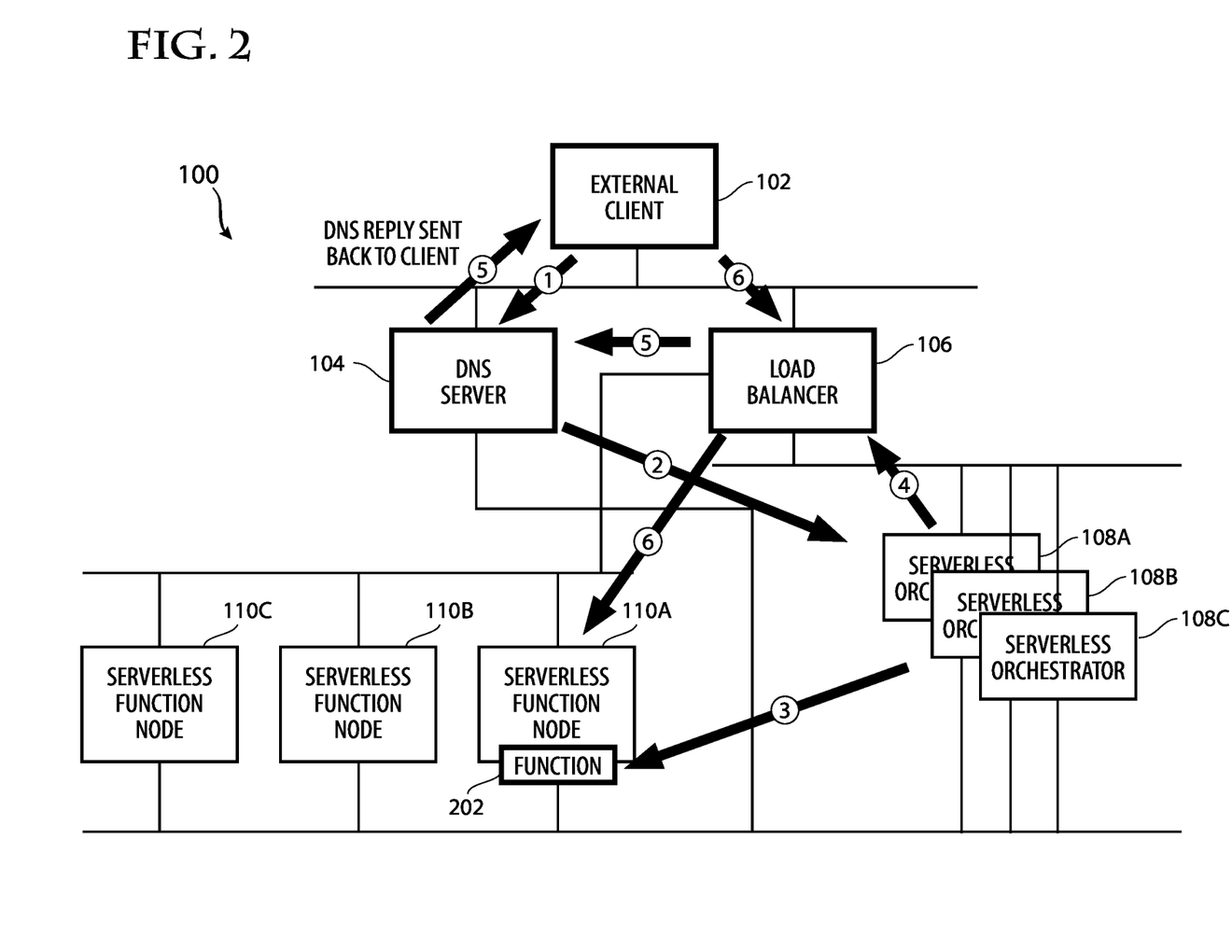
FIG. 2 illustrates a header structure.

The disclosure includes the component shown in FIG. 1 and FIG. 2. Is first example provides an illustration of the process from the standpoint of a request made by an external client. The network 100 includes an external client 102 that communicates with the network 100. A DNS server 104 is used to identify, based on a DNS request from the client 102, serverless function nodes 110A, 110B and 110C. A load balancer 106 is also used in communication with various serverless orchestrators or serverless orchestrator system 108A, 108B, 108C. The load balancer 106 typically handles ingress traffic associated with the API calls backed by the serverless functions. The DNS server 104 is tied very closely to the load balancer 106 and handles DNS queries both externally (i.e., application programming interface requests or API requests into the serverless environment) as well as internally (API requests between services). These basic components are used to receive API calls from the external client 102 which requests particular services and which can be used to initiate the serverless functions in order to respond and provide the necessary service to the external client 102. The serverless orchestration system 108A, 108B, 108C handles running certain actions, typically as containers in support of API calls.

In a first step, the external client 102 can provide a request for a service that includes a DNS query to the DNS server 104. In one aspect, the DNS server has a mapping of a particular DNS name to a particular service. The data regarding that mapping can be sent to the serverless orchestrator system 108A, 108B, 108C. The DNS server 104 will notify a serverless orchestrator system 108A, 108B, 108C about the request in a second step. The serverless orchestrator system 108A, 108B, 108C implements algorithms for spinning up the respective functions. The data that is received from the DNS server 104 can be incorporated into the algorithm for spinning up the functions. In a third step, the serverless orchestrator system 108A, 108B, 108C will spin up a function on one of the serverless function nodes 110A, 110B, 110C as a Function as a Service (FaaS). In a fourth step, the serverless orchestrator system 108A, 108B, 108C can signal the load balancing component 106 and provide data about the node that is running the function. The load balancer 106 notifies the DNS server 104 regarding the function and where it is deployed. The DNS server 104 can provide a DNS reply back to the client 102. At this stage, when the external client 102 transmits an API request for the service, the request can be processed by the system, for example by the load balancer 106, and can be sent to the node 110A already running the function 202. The load balancer 106 knows exactly which servers to communicate the request to and can therefore route the request to the appropriate server 110A that is running the already deployed function. The method can include any one or more of the above steps in any order.

Figure 3:
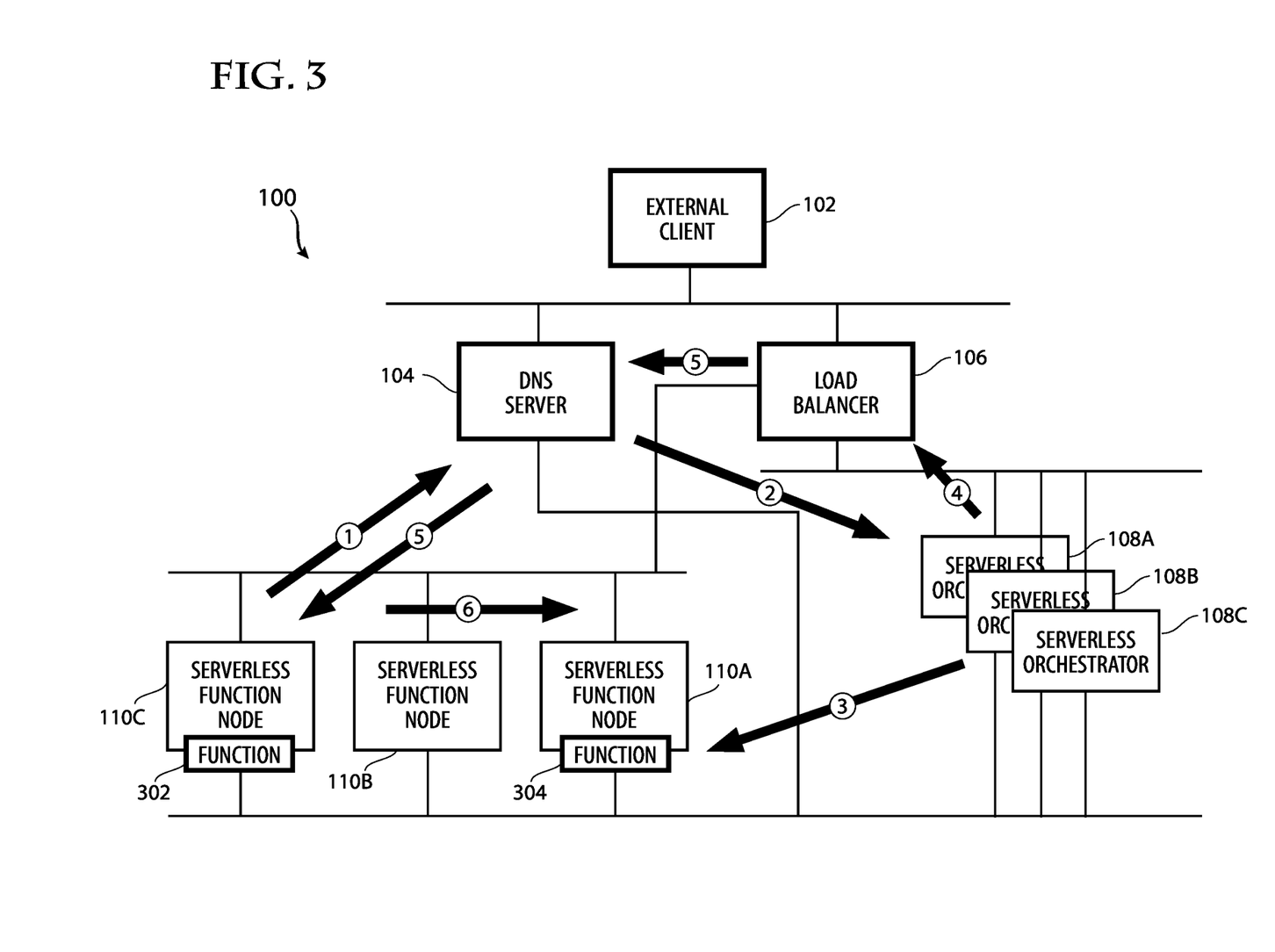
FIG. 3 illustrates a method embodiment from the standpoint of the internal segmentation orchestrator.

FIG. 3 illustrates another aspect of this disclosure with respect to an internal request from the network 100. The internal request in this case can come from a serverless function node 100C and can be associated with a function operating on that node. The request can be transmitted to the DNS server 104 in a first step. In a second step, the DNS server 104 can notify the serverless orchestrator system 108A, 108B, 108C about the request. The serverless orchestrator system 108A, 108B, 108C in a third step can spin up a function 304 on a serverless function node 110A. In a fourth step, the serverless orchestrator system 108A, 108B, 108C can signal the load balancer 106 regarding the node running the function. In a fifth step, the load balancer 106 can notify the DNS server 104 regarding the serverless function node 110A running the function 304. The DNS server 104 as part of this step can also provide a reply back to the serverless function node 110C. In a sixth step, an API request can be sent from the serverless function nodes 110C to the serverless function node 110A which, by this point, is already running the function 304. Under this approach, the function 302, as it initiates the process of connecting to function 304, will already have the function 304 spun up on the appropriate serverless function node 110A by the time the function 302 actually makes the API request that is sent to the proper node 110A.

Sometimes, API requests might be multi-layered. For example, if the client (internal or external) is going to is going to make an API request, it may require data access or the client might want to manipulate some data. In such a case, the API request may relate to data manipulation. The initial service function can make another API call, which can be routed to another node or location to retrieve the data, or manipulate the data. In a multi-layered scenario, one function may be spun up to handle a first task, and that function may need to perform an API call to handle a second task. In order to handle the second task, the first function will look up the DNS record for that task. A similar process can be initiated to use the DNS server 104 to notify the serverless orchestrator system 108A, 108B, 108C of the request. The serverless orchestrator system 108A, 108B, 108C then spins up the particular function, and notifies the load balancer 106 regarding the proper node, and then returns the DNS reply. The process ends up being similar whether the newly spun up function is internal or external.

If there are subsequent DNS queries after the arrangement gets set up, the DNS server 104 will still pass those queries or data associated with those queries to the serverless orchestrator system 108A, 108B, 108C. The serverless orchestrator system 108A, 108B, 108C will typically know whether the function is already running on a particular node. In the particular case of an external request, once the function is up and running and the request comes through, the request is like a single API request. Assume that the system gets millions of API requests from thousands of clients. With all these notices being received by DNS servers at the serverless orchestrator system 108A, 108B, 108C, it would be helpful to understand the rate of DNS traffic that is coming in because the serverless orchestrator system 108A, 108B, 108C is likely going to want to start multiple service functions and provision them on multiple nodes. In one scenario, one node 110A, 110B or 110C might end up with multiple functions running. Or the system could end up with functions spread across the nodes. The system can continue to get data from these DNS requests and the serverless orchestrator system 108A, 108B, 108C can continue to spin up these serverless functions and indicate to the load balancers 106 where they are running. The basic point of discussing the process of quickly deploying serverless functions is that the rate of requests and other factors can be taken into account when implementing the algorithms to deploy functions on particular nodes. The algorithm, for example, might distribute the functions across the nodes in a particular pattern or at a particular location based on a number of factors about the overall DNS requests and system usage.

Figure 4:
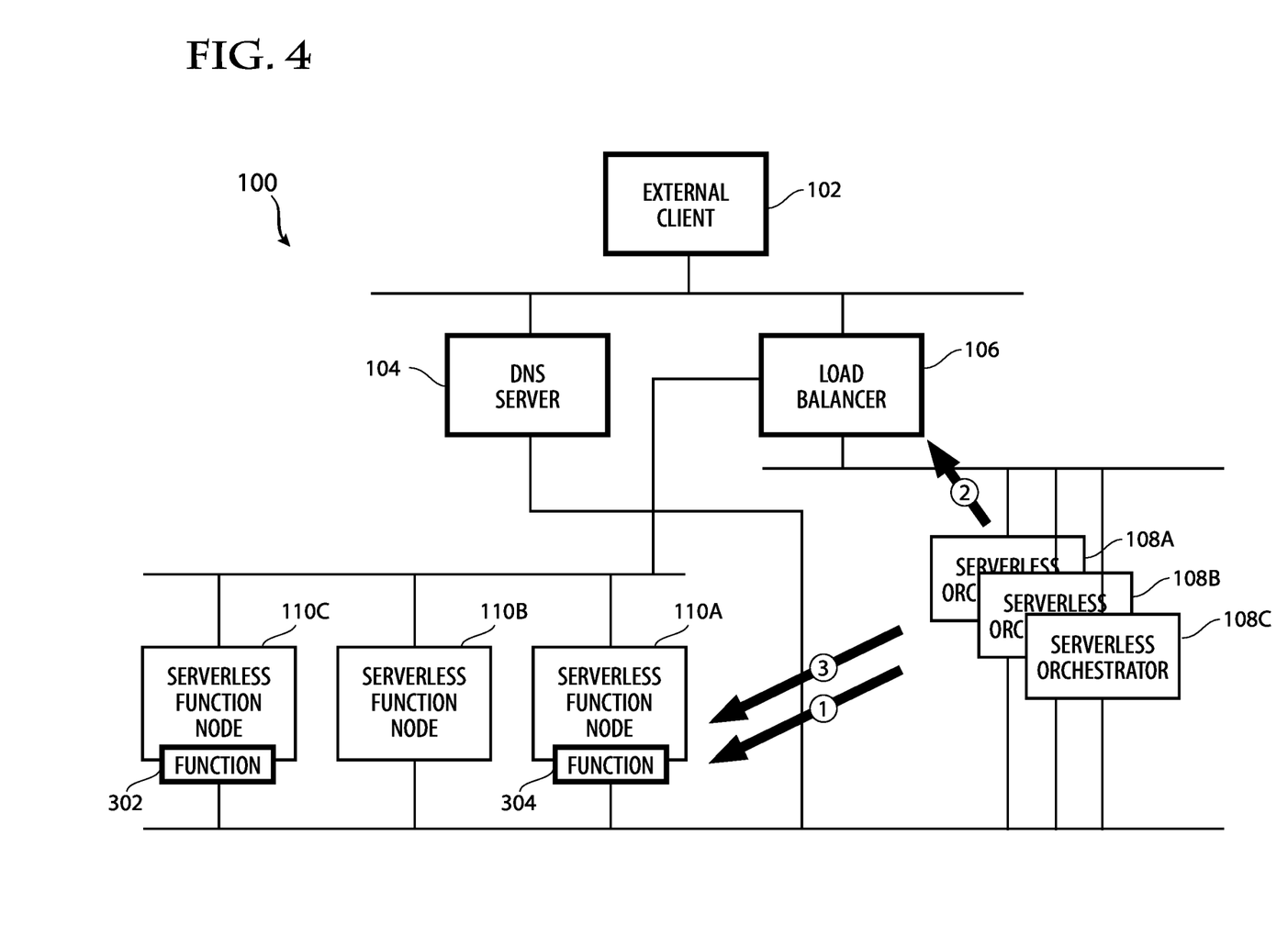
FIG. 4 illustrates a method embodiment from the standpoint of the external segmentation orchestrator.

FIG. 4 illustrates a removal process for removing functions. A first step involves the serverless orchestrator system 108A, 108B, 108C bringing down the function running on the serverless function node 110A. The second step of removal can involve the serverless orchestrator system 108A, 108B, 108C notifying the load balancer 106 that the function 304 is no longer running on the serverless function node 110A. The third step can involve actually removing the function 304 from the function node 110A.

The above approach ties service functions to DNS names because in these types of serverless environments, it is common for a service to be represented by DNS records. Furthermore, a service is likely to be an API endpoint. Therefore, behind any API is likely a serverless function that will have to be spun up at some point. Therefore, the approach to spinning up serverless functions as well as a removal process is achieved through the tight coupling of the DNS system 104 and the load balancer 106 and some sort of orchestration system for the serverless environment that will actually spin up the function as initiated by a DNS query. In other words, the system uses DNS queries as a sort of indicator to feed into an algorithm around container orchestration. The DNS query can indicate that is likely to have to spin up a function and that there is likely going to be an API request coming shortly that will require that function. Accordingly, one aspect of this disclosure relates to initiating the spin up of a serverless function based on a DNS query such that a follow-up API request can quickly be serviced by an already running serverless function on an appropriate serverless function node. The approach can apply both to external clients requesting services to a network as well as from an internal clients or internal components/functions within the network itself.

Figure 5:
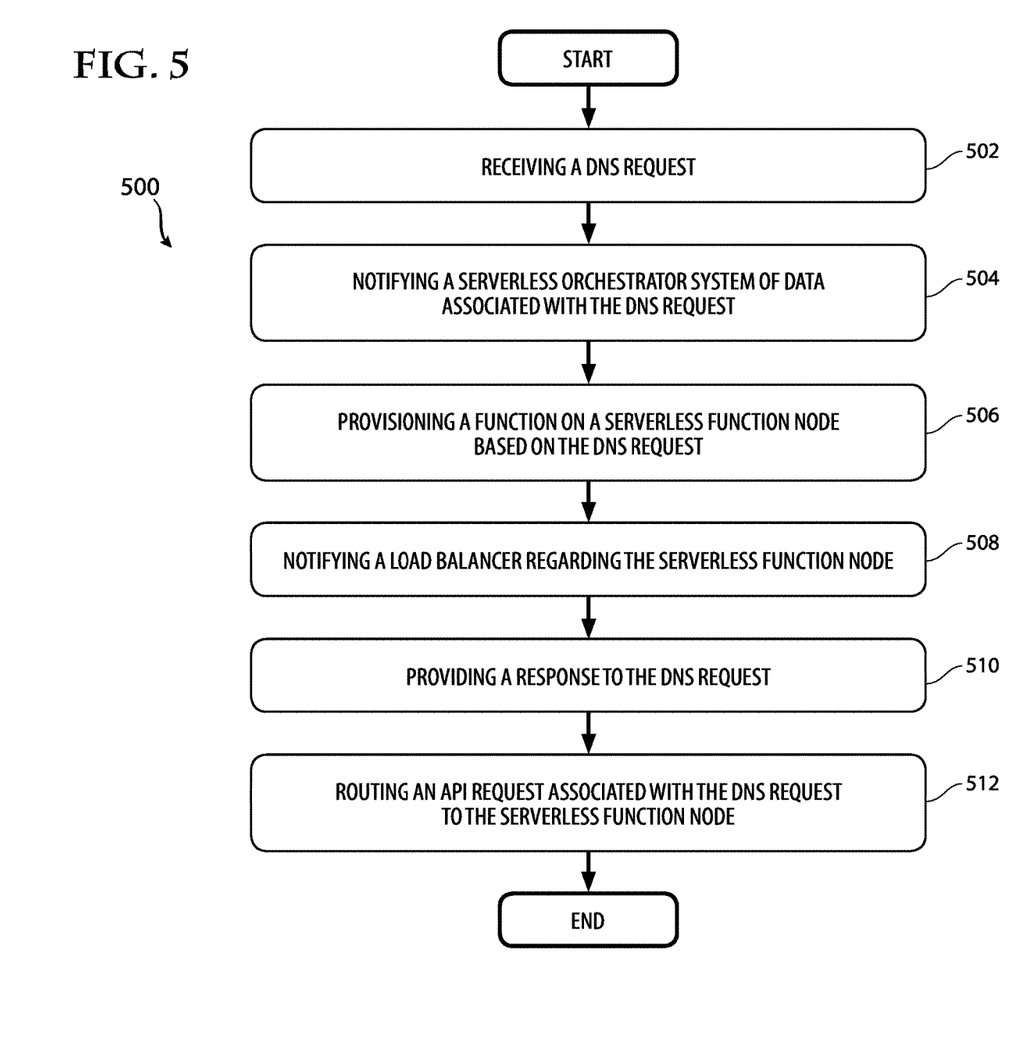
FIG. 5 illustrates a method embodiment from the standpoint of the trusted network edge.

FIG. 5 illustrates an example method. The method in this example is performed by various coordinated components within the system. Some steps are performed by the DNS server 104, other steps are performed by the load balancer 106 and other steps are performed by the serverless orchestrator system 108A, 108B, 108C. The method includes receiving a DNS request (502), notifying a serverless orchestrator system of data associated with the DNS request (504), provisioning a function on a serverless function node based on the DNS request (506), notifying a load balancer regarding the serverless function node (508), providing a response to the DNS request (510) and routing an API request associated with the DNS request to the serverless function node (512). The domain name system request can be received from one of an internal entity or an external entity.

In one aspect, the method can include, after the function on the serverless function node performs an operation based on the application programming interface request, removing the function from the serverless function node. Other alternate steps include providing the response to the domain name system request after the function is provisioned on the serverless function node. The data associated with the domain name system request can be used by an algorithm on a serverless orchestrator to spin up the function on the serverless function node. In another aspect, the data can include one or more parameters associated with characteristics of a workload to be performed by the function on the serverless function node.

In yet another aspect, the method can include one or more of the following: (1) the receiving of the domain name system request can be performed by a domain name server; (2) the notifying of the serverless orchestrator system can be performed by the domain name server; (3) the provisioning of the function on the serverless function node can be performed by the serverless orchestrator system; (4) the notifying of the load balancer regarding the serverless function node operating the function can be performed by the serverless orchestrator system; (5) the providing of the response to the domain name system request can be performed by the domain name server; and (6) the routing of the application programming interface request associated with the domain name system request to the serverless function node an be performed by a load balancer.

The data associated with the domain name system query can be used by an algorithm on a serverless orchestrator to spin up the function on the serverless function node. In one aspect, the data can include one or more parameters associated with characteristics of a workload to be performed by the function on the serverless function node.

In a system aspect, a system can include one or more processor and a computer readable medium, storing instructions which, when executed by the processor, cause the one or more processor to perform operations including one or more of: (1) receiving a domain name system request; (2) notifying a serverless orchestrator system of data associated with the domain name system request; (3) provisioning a function on a serverless function node based on the domain name system request; (4) notifying a load balancer regarding the serverless function node operating the function; (5) providing a response to the domain name system request; and (6) routing an application programming interface request associated with the domain name system request to the serverless function node.

One aspect of this disclosure is a computer-readable storage device that stores instructions which, when executed by one or more processors, cause is the one or more processors to perform operations including one or more of: (1) receiving a domain name system request; (2) notifying a serverless orchestrator system of data associated with the domain name system request; (3) provisioning a function on a serverless function node based on the domain name system request; (4) notifying a load balancer regarding the serverless function node operating the function; (5) providing a response to the domain name system request; and (6) routing an application programming interface request associated with the domain name system request to the serverless function node.

Typically, the DNS server 104, as part of resolving an internal service, will notify the serverless orchestration system that it has received a request for the service. The serverless functions are mapped 1:1 to DNS names. Thus, the serverless orchestration system 108A, 108B, 108C knows which item or function to spin up so that they are in hot standby for an expected incoming API request. The serverless orchestrator system 108A, 108B, 108C can signal a load balancer 106 regarding the location of the host where the new function will be running. This of course can be a host in a cluster, a cloud computing environment or any other network. Once the function is operating on the host, subsequent API request from the client or from another function can now be sent into the system through the load balancer 106 to the host which is already running the serverless function.

This disclosure provides an integration of initial DNS queries as a marker or data associated with the likely future API call to a serverless function. This information is therefore used to proactively spin up the appropriate serverless function by a container orchestration system so it is up and running and ready to handle the API request. The approach disclosed herein represents an augmenting of the serverless orchestrator's algorithm which influences the creation of functions. It does not need to be solely based on DNS queries. Subsequent queries may have to rely on the TTL (time to live) of those records in the DNS system and their interaction with the serverless orchestrator's algorithm. The function will eventually be running and cached queries from a client can result in the client hitting those instances. The system does in one aspect take into account TTL on the DNS inquiries and the serverless orchestrator system 108A, 108B, 108C can understand these values to feed in to its algorithm. Another way to describe this disclosure is to include data associated with DNS queries into logic used by an orchestrator to spin up serverless functions. The logic can also involve data regarding timing of when to implement a serverless function, on which host to implement a serverless function, how many compute resources to use for the spun up function, and so forth. For example, the DNS query may also include other data which can drive the algorithm for how when and where to spin up a serverless function. For example, a DNS query might indicate that the later API request might be related to the need for data from a database, or bandwidth for communicating data from one function to another, or a large amount of computing power to run a complicated algorithm, and so forth. Thus, there might be aspects of the DNS query which could be enhanced as well to give clues or parameters associated with the characteristics of a later API request. Such parameters associated with the DNS query can be then utilized by the orchestrator algorithm to make deployment or provisioning decisions with respect to the function. For example the DNS query might include a geographic component which may drive which host to provision the function so that it is closer to the function or client which made the request.

The concepts described herein can also be applied from the standpoint of each individual component. For example, the steps only performed by the DNS server may also be applicable in one aspect. The steps performed by the load balancer may also be considered as one example aspect. Similarly, the operations of the serverless orchestrator could also be separately covered. Finally, the operations from an external client, an internal client, a function operating on a serverless function node, and so forth, can each be separately covered and considered a separate embodiment. For example, the DNS server 104 could be described and covered with respect to signals it receives, signals it sends, steps that it takes, and so forth, in the context of the overall process set forth herein. Therefore, each individual component should be considered as potentially being covered as a separate device or separate component within the overall system and any of the operations described herein as viewed by or as performed by any individual component could be covered separately.

Figure 6:
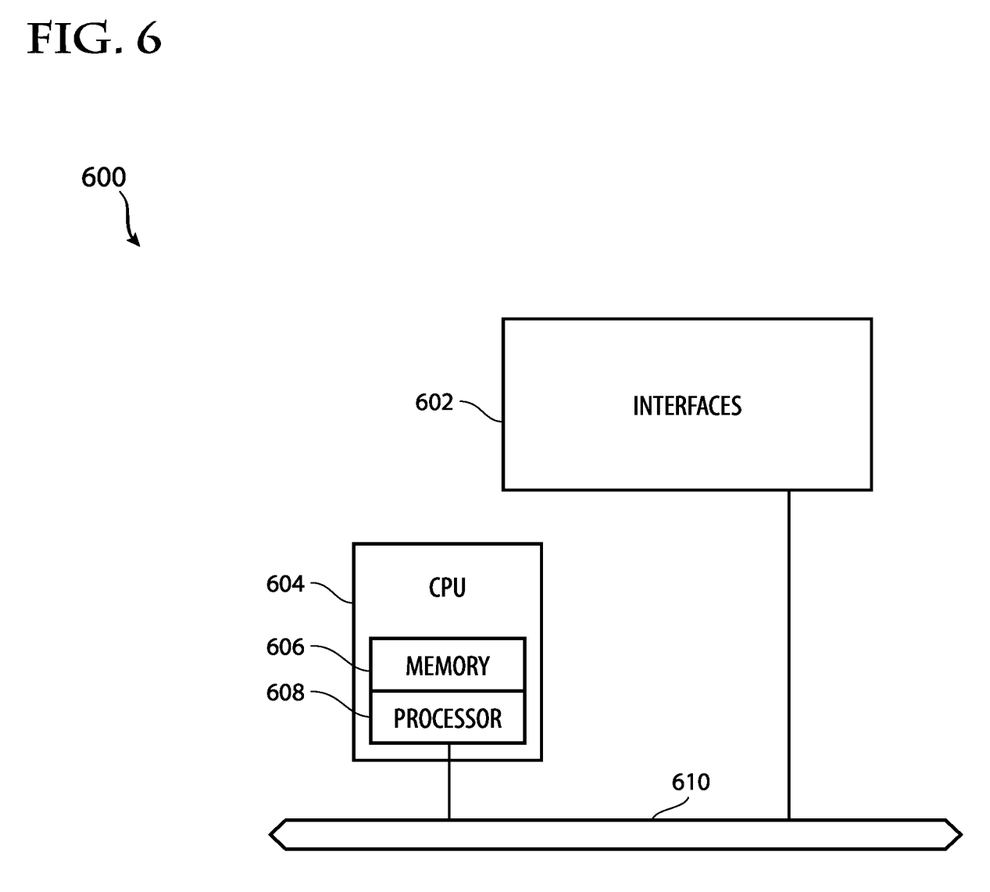
FIG. 6 illustrates an example network device in accordance with various examples.

FIG. 6 illustrates an example network device 600 suitable for implementing aspects of this disclosure. In some examples, the control plane 310 and/or the SVP 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces. DSL (digital subscriber line) interfaces, token ring interfaces, and the like. In addition, various very high-speed interfaces may be provided such as fast token ring interfaces, wireless interfaces, Ethernet interfaces, Gigabit Ethernet interfaces, ATM interfaces. HSSI (high-speed serial interface) interfaces, POS (packet over SONET/SDH) interfaces, FDDI (fiber distributed data interface) interfaces, WiFi interfaces, 3G/4G/5G cellular interfaces, CAN BUS (controller area network bus), LoRA (long range), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
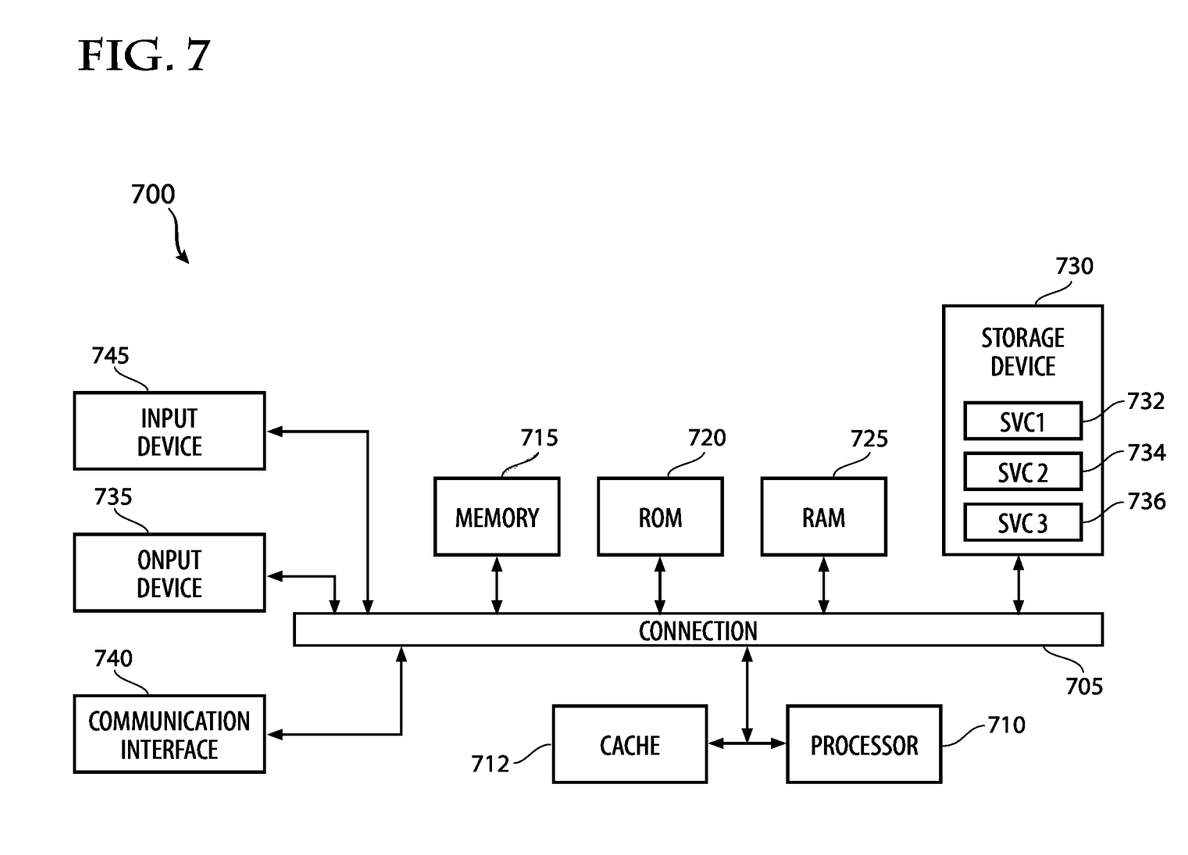
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB (universal serial bus) devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, via a computing device managing an application programing interface (API) and from one of an internal client or an external client, a domain name system request;
communicating, from the computing device, the domain name system request to a domain name system;
notifying an orchestrator system of data associated with the domain name system request, wherein the data indicates that the orchestrator system needs to quickly spin up a function associated with an entity comprising one of a virtual machine, one or more containers or a physical node according to: (1) a geographic component which can impact a location of the entity as being closer to an existing function or a client that made the domain name system request and (2) a function distribution algorithm, operated by the orchestrator system, that implements a chosen pattern of distributing functions across nodes based on domain name system requests and system usage;

provisioning, by the orchestrator system and based on the data and the geographic component and the chosen pattern of distributing functions across nodes, the function on the entity;

notifying, by the orchestrator system, a load balancer regarding the entity operating the function, wherein the load balancer is a separate device from the domain name system;

providing a response to the domain name system request;

receiving an API request from one of the internal client or the external client and via the API operating on the computing device;

when the API request is from the external client, routing, via the computing device operating the API, the API request directly to the load balancer and routing, by the load balancer, the API request associated with the domain name system request to the entity; and when the API request is from the internal client, routing, via the computing device operating the API, the API request from the internal client to the entity.

2. The method of claim 1, wherein the orchestrator system comprises a serverless orchestrator system.

3. The method of claim 1, further comprising:
after the function on the entity performs an operation based on the API request, removing the function from the entity.

4. The method of claim 1, further comprising:
providing the response to the domain name system request after the function is provisioned on the entity.

5. The method of claim 1, wherein the data associated with the domain name system request is used by an algorithm on the entity to spin up the function on the entity.

6. The method of claim 5, wherein the data comprises one or more parameters associated with characteristics of a workload to be performed by the function on the entity.

7. The method of claim 1, wherein:
the notifying of the orchestrator system is performed by the domain name system; and
the providing of the response to the domain name system request is performed by the domain name system.

8. A system comprising:
one or more processor; and
a computer readable medium storing instructions which, when executed by the one or more processor, cause the one or more processor to perform operations comprising:
receiving, via an application programing interface (API) and from one of an internal client or an external client, a domain name system request;
communicating the domain name system request to a domain name system;
notifying an orchestrator system of data associated with the domain name system request, wherein the data indicates that the orchestrator system needs to quickly spin up a function associated with an entity comprising one of a virtual machine, one or more containers or a physical node according to: (1) a geographic component which can impact a location of the entity as being closer to an existing function or a client that made the domain name system request and (2) a function distribution algorithm, operated by the orchestrator system, that implements a chosen pattern of distributing functions across nodes based on domain name system requests and system usage;

provisioning, by the orchestrator system and based on the data and the geographic component and the chosen pattern of distributing functions across nodes, the function on the entity;

notifying a load balancer regarding the entity operating the function, wherein the load balancer is a separate device from the domain name system;

providing a response to the domain name system request;

receiving an API request from one of the internal client or the external client and via the API;

when the API request is from the external client, routing, via the API, the API request directly to the load balancer and routing, by the load balancer, the API request associated with the domain name system request to the entity; and when the API request is from the internal client, routing, via the API, the API request from the internal client to the entity.

9. The system, of claim 8, wherein the orchestrator system comprises a serverless orchestrator system.

10. The system of claim 8, wherein the computer readable medium stores additional instructions which, when executed by the one or more processor, cause the one or more processor to perform operations further comprising:
after the function on the entity performs an operation based on the API request, removing the function from the entity.

11. The system of claim 8, wherein the computer readable medium stores additional instructions which, when executed by the one or more processor, cause the one or more processor to perform operations further comprising:
providing the response to the domain name system request after the function is provisioned on the entity.

12. The system of claim 8, wherein the data associated with the domain name system request is used by an algorithm on the orchestrator system to spin up the function on the entity.

13. The system of claim 12, wherein the data comprises one or more parameters associated with characteristics of a workload to be performed by the function on the entity.

14. The system of claim 8, wherein:
the receiving of the domain name system request is performed by a domain name system;
the notifying of the orchestrator system is performed by the domain name system;
the provisioning of the function on the entity is performed by the orchestrator system;
the notifying of the load balancer regarding the entity operating the function is performed by the orchestrator system; and
the providing of the response to the domain name system request is performed by the domain name system.

15. A non-transitory computer-readable storage device storing instructions which, when executed by one or more processors, cause is the one or more processors to perform operations comprising:
receiving, via an application programing interface (API) and from one of an internal client or an external client, a domain name system request;
communicating the domain name system request to a domain name system;

notifying an orchestrator system of data associated with the domain name system request, wherein the data indicates that the orchestrator system needs to quickly spin up a function associated with an entity comprising one of a virtual machine, one or more containers or a physical node according to: (1) a geographic component which can impact a location of the entity as being closer to an existing function or a client that made the domain name system request and (2) a function distribution algorithm, operated by the orchestrator system, that implements a chosen pattern of distributing functions across nodes based on domain name system requests and system usage;

provisioning, by the orchestrator system and based on the data and the geographic component and the chosen pattern of distributing functions across nodes, the function on the entity;

notifying a load balancer regarding the entity operating the function, wherein the load balancer is a separate device from the domain name system;

providing a response to the domain name system request;

receiving an API request from one of the internal client or the external client and via the API;

when the API request is from the external client, routing, via the API, the API request directly to the load balancer and routing, by the load balancer, the API request associated with the domain name system request to the entity; and when the API request is from the internal client, routing, via the API, the API request from the internal client to the entity.

16. The non-transitory computer-readable storage device of claim 15, wherein the orchestrator system comprises a serverless orchestrator system.

17. The non-transitory computer-readable storage device of claim 15, wherein the non-transitory computer-readable storage device stores additional instructions which, when executed by the one or more processors, cause the one or more processors to perform operations further comprising:
after the function on the entity performs an operation based on the API request, removing the function from the entity.

18. The non-transitory computer-readable storage device of claim 15, wherein the non-transitory computer-readable storage device stores additional instructions which, when executed by the one or more processors, cause the one or more processors to perform operations further comprising:
providing the response to the domain name system request after the function is provisioned on the entity.

19. The non-transitory computer-readable storage device of claim 15, wherein the data associated with the domain name system request is used by an algorithm on the orchestrator system to spin up the function on the entity.

20. The non-transitory computer-readable storage device of claim 19, wherein the data comprises one or more parameters associated with characteristics of a workload to be performed by the function on the entity.

* * * * *